(12) United States Patent
Bartley et al.

(10) Patent No.: US 7,945,883 B2
(45) Date of Patent: May 17, 2011

(54) APPARATUS, AND COMPUTER PROGRAM FOR IMPLEMENTING VERTICALLY COUPLED NOISE CONTROL THROUGH A MESH PLANE IN AN ELECTRONIC PACKAGE DESIGN

(75) Inventors: Gerald Keith Bartley, Rochester, MN (US); Darryl John Becker, Rochester, MN (US); Paul Eric Dahlen, Rochester, MN (US); Philip Raymond Germann, Oronoco, MN (US); Andrew Benson Maki, Rochester, MN (US); Mark Owen Maxson, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 12/172,300

(22) Filed: Jul. 14, 2008

(65) Prior Publication Data
US 2008/0270968 A1 Oct. 30, 2008

Related U.S. Application Data

(63) Continuation of application No. 11/089,472, filed on Mar. 24, 2005, now Pat. No. 7,472,368.

(51) Int. Cl.
*G06F 17/50* (2006.01)

(52) U.S. Cl. ............................................ 716/115; 716/137
(58) Field of Classification Search ............. 716/5, 15, 716/20, 115, 137
See application file for complete search history.

(56) References Cited

U.S. PATENT DOCUMENTS

| | | |
|---|---|---|
| 2001/0049813 A1* | 12/2001 | Chan et al. .................... 716/8 |
| 2002/0073384 A1 | 6/2002 | Buffet et al. |
| 2003/0212980 A1 | 11/2003 | Frank et al. |
| 2004/0015806 A1 | 1/2004 | Frank et al. |
| 2004/0145033 A1 | 7/2004 | McElvain |
| 2004/0219688 A1 | 11/2004 | Churchill et al. |
| 2004/0222514 A1 | 11/2004 | Crane et al. |
| 2006/0184904 A1* | 8/2006 | Murgai et al. .................... 716/4 |
| 2006/0236276 A9 | 10/2006 | Frank et al. |

* cited by examiner

*Primary Examiner* — Sun J Lin
*Assistant Examiner* — Suresh Memula
(74) *Attorney, Agent, or Firm* — Joan Pennington

(57) ABSTRACT

A method, apparatus and computer program product are provided for implementing vertically coupled noise control through a mesh plane in an electronic package design. Electronic package physical design data are received. Instances of vertically coupled noise in the electronic package physical design data are identified. The identified instances of vertically coupled noise are quantified. Then the electronic package physical design data are modified to limit the vertically coupled noise.

5 Claims, 9 Drawing Sheets

700

APPARATUS, AND COMPUTER PROGRAM FOR IMPLEMENTING VERTICALLY COUPLED NOISE CONTROL THROUGH A MESH PLANE IN AN ELECTRONIC PACKAGE DESIGN

This application is a continuation application of Ser. No. 11/089,472 filed on Mar. 24, 2005.

FIELD OF THE INVENTION

The present invention relates generally to the semiconductor devices, and more particularly to a method, apparatus and computer program product for implementing vertically coupled noise control through a mesh plane in an electronic package design.

DESCRIPTION OF THE RELATED ART

Electronic packages typically include multiple layers or planes including multiple signal, voltage and ground planes. Some electronic packages utilize a mesh structure to construct what appears to be voltage or ground plane. The mesh structure is needed to allow enough non-metal area to insure proper joining or lamination of the plane structures.

When designing an electronic package that must utilize a mesh plane, such as, for a power plane or a ground plane, many times the adjacent signal traces may line up with holes in the mesh rather than on the mesh lines. In some cases the signal lines may not line up on the mesh lines due to its relative placement in the escape from the chip, or due to the signal line escaping diagonally across the mesh openings.

A signal line disposed above or below mesh holes in the mesh plane has a different characteristic impedance than a signal line disposed directly above or below a mesh trace. Signal crosstalk also may occur to a greater extent through the mesh holes to signal traces disposed above or below the mesh holes.

U.S. patent application Ser. No. 10/632,183, to Bartley et al., filed Jul. 31, 2003 and assigned to the present assignee, discloses a method, apparatus, and computer program product provided for creating customized mesh planes in electronic packages. Electronic package physical design data is received and signal traces in each adjacent plane to a mesh plane are compared with the mesh layout. Signal traces adjacent to mesh holes are identified. One or more fill methods are selected to modify the mesh layout to replace selected mesh holes with added mesh structure aligned with the identified signal traces.

Coupled noise transferred vertically through a mesh plane in an electrical package design is difficult to quantify on a net-by-net basis. Current techniques are very prone to human error as well as an inefficient way of solving this problem.

High frequency use of mesh planes have typically been utilized in ceramic first level packages. An industry trend is beginning where high speed interfaces may also be routed on flex cables, which include mesh planes as references for increased flexibility. There are also instances inside a laminate First Level Package where a reference plane is a mesh plane due to design constraints.

As design margin becomes tighter as bandwidths increase; a need exists for a mechanism that enables understanding, quantifying and limiting vertically coupled noise control through a mesh plane in an electronic package design.

SUMMARY OF THE INVENTION

A principal aspect of the present invention is to provide a method, apparatus and computer program product for implementing vertically coupled noise control through a mesh plane in an electronic package design. Other important aspects of the present invention are to provide such method, apparatus and computer program product for implementing vertically coupled noise control through a mesh plane in an electronic package design substantially without negative effect and that overcome many of the disadvantages of prior art arrangements.

In brief, a method, apparatus and computer program product are provided for implementing vertically coupled noise control through a mesh plane in an electronic package design. Electronic package physical design data are received. Instances of vertically coupled noise in the electronic package physical design data are identified. The identified instances of vertically coupled noise are quantified and the electronic package physical design data are modified to limit the vertically coupled noise.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
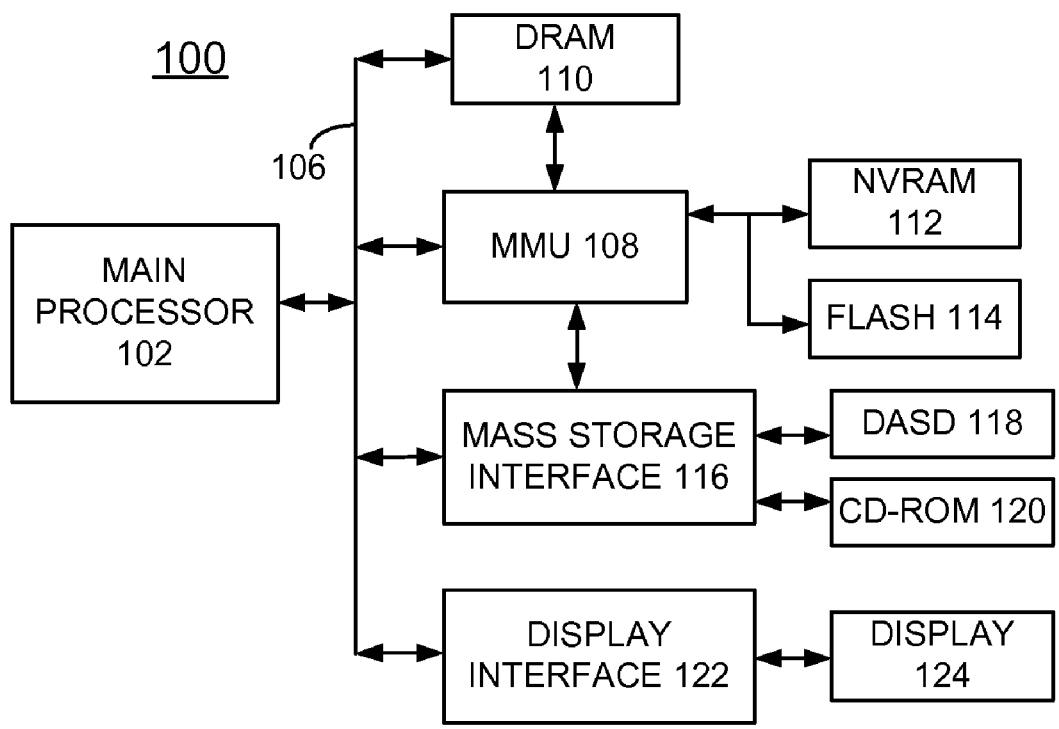
FIGS. 1 and 2 are block diagram representations illustrating a computer system and operating system for implementing vertically coupled noise control through a mesh plane in an electronic package design in accordance with the preferred embodiment.
Figure 2:
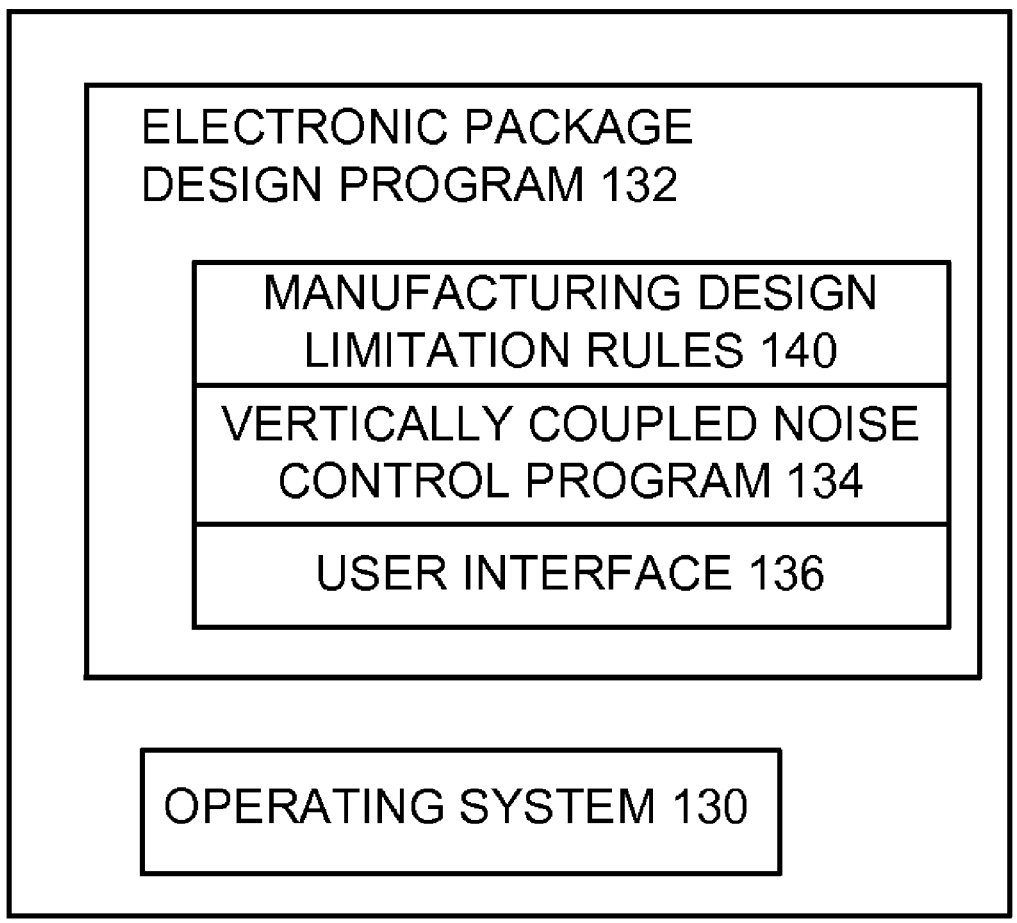

Referring now to the drawings, in FIGS. 1 and 2 there is shown a computer system generally designated by the reference character 100 for implementing methods for vertically coupled noise control through a mesh plane within electronic packages in accordance with the preferred embodiment. Computer system 100 includes a main processor 102 or central processor unit (CPU) 102 coupled by a system bus 106 to a memory management unit (MMU) 108 and system memory including a dynamic random access memory (DRAM) 110, a nonvolatile random access memory (NVRAM) 112, and a flash memory 114. A mass storage interface 116 coupled to the system bus 106 and MMU 108 connects a direct access storage device (DASD) 118 and a CD-ROM drive 120 to the main processor 102. Computer system 100 includes a display interface 122 coupled to the system bus 106 and connected to a display 124.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, multiple main processors.

As shown in FIG. 2, computer system 100 includes an operating system 130, an electronic package design program 132, a vertically coupled noise control program 134 of the preferred embodiment, and a user interface 136. Manufacturing design limitation rules 140 are stored in accordance with the vertically coupled noise control methods of the preferred embodiment.

Various commercially available computers can be used for computer system 100, for example, an IBM personal computer. CPU 102 is suitably programmed by the vertically coupled noise control program 134 to execute the flowchart of FIG. 3 for implementing vertically coupled noise control through a mesh plane within electronic packages in accordance with the preferred embodiment.

In accordance with features of the preferred embodiment, methods are provided for implementing vertically coupled noise control through a mesh plane within electronic packages that are more efficient, more accurate and easier to solve than conventional processes that are both prone to human error and generally inefficient in solving this problem. The method and vertically coupled noise control program 134 of the preferred embodiment allows the user to either have the program 134 fix the coupled noise problem or the user to manually provide corrections. Methods of the preferred embodiment include moving signal traces and adding additional mesh to the mesh layer between the existing traces for reducing coupled noise.

In accordance with features of the preferred embodiment, methods are provided for identifying, quantifying and limiting instances of vertically coupled noise through a mesh plane in electrical package design. The user of the vertically coupled noise control program 134 of the preferred embodiment has the flexibility to set coupled noise thresholds as well as specifying the preferred mechanisms or noise coupling reduction methodology for reducing the coupling; i.e., moving the signal traces or filling in the mesh. This method and apparatus of the preferred embodiment uses these inputs along with the electrical design file to either regenerate the design file with fixes in place, or notify the user on the locations and severity of the coupled noise. This is accomplished either through a gradient visual representation of the hotspots of coupling, or through an ASCII text file with X,Y coordinates along with coupling values.

Figure 3:
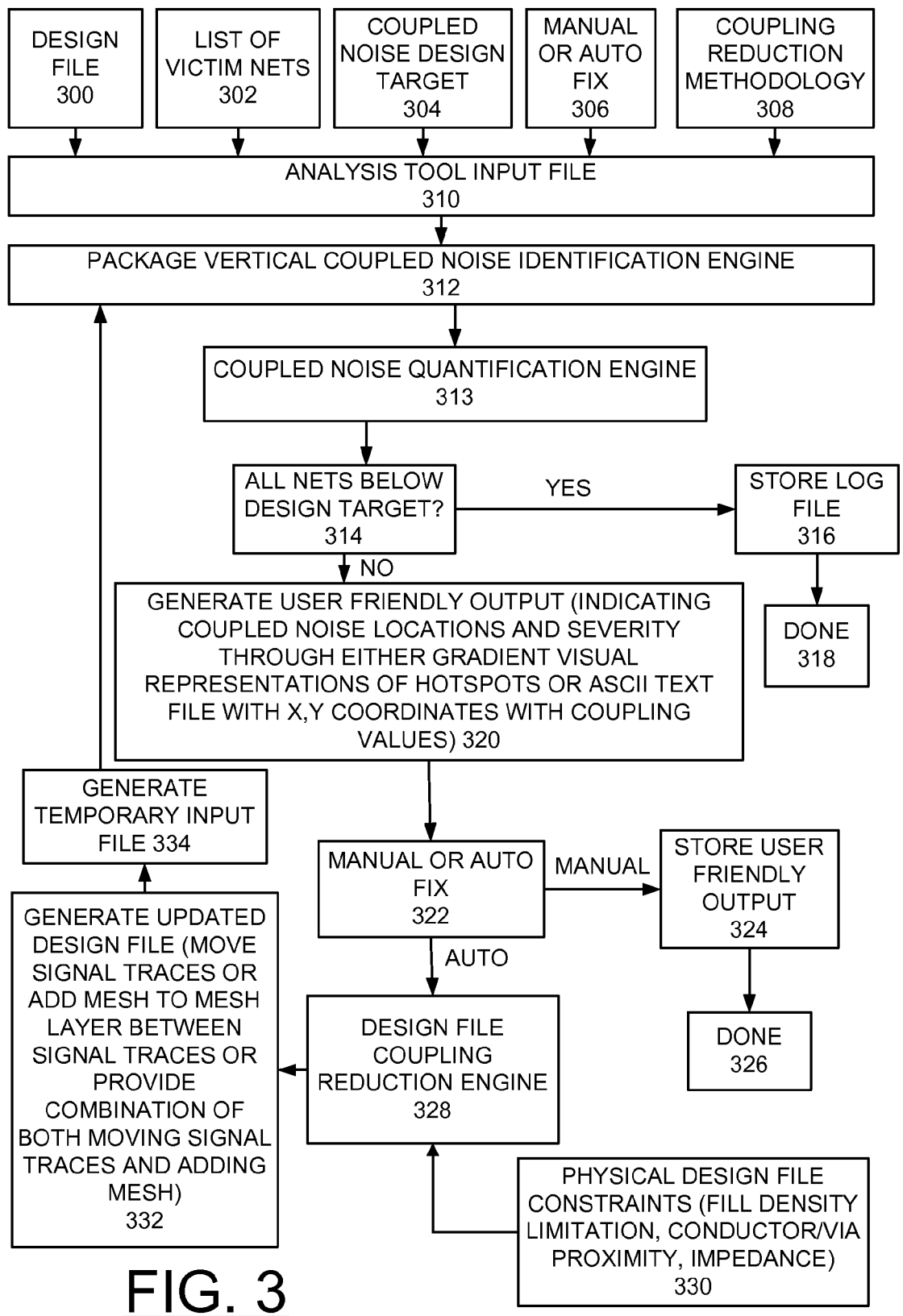
FIG. 3 is a flow chart illustrating exemplary sequential steps for implementing vertically coupled noise control through a mesh plane in accordance with the preferred embodiment.

Referring to FIG. 3, there are shown exemplary steps performed by the computer system 100 for implementing methods for vertically coupled noise control through a mesh plane within electronic packages in accordance with the preferred embodiment. Electronic and package physical design data or system design inputs for a module package arrangement are received as indicated in a plurality of blocks 300, 302, 304, 306, and 308 and applied to an analysis tool input file as indicated in a block 310.

Received system design inputs include a design file at block 300, a list of victim nets at block 302, a coupled noise design target at block 304, a manual or automatic fix selection at block 306, and a coupling reduction methodology at block 308. The analysis tool input file at block 310 is coupled to a package vertical coupled noise identification engine 312 that identifies victim nets without looking at mesh coverage.

Next a coupled noise quantification engine 313 quantifies noise coupling with a mesh plane, for example, using one or more lookup tables, a comprehensive math equation, and/or a dump to a field-solver. Then all the nets are compared to the coupled noise design target as indicated in a block 314. If all the nets are less than the coupled noise design target, then a log file is stored as indicated in a block 316. This completes the exemplary operations as indicated in a block 318.

Otherwise, if all the nets are not less than the coupled noise design target, then a user friendly output is generated as indicated in a block 320, for example, indicating the locations and severity of the coupled noise through a gradient visual representation of the hotspots of coupling, or through an ASCII text file with X,Y coordinates along with coupling values. Checking for a manual or automatic fix selection is provided as indicated in a block 322. If a manual selection is identified, then the user friendly output is stored as indicated in a block 324. Then the exemplary operations are completed as indicated in a block 326.

If an automatic fix selection is identified, then a design file coupling reduction engine as indicated in a block 328 receives physical design file constraints as indicated in a block 330, such as mesh fill density limitations, conductor/via proximity, and impedance limitations. An updated design file is generated as indicated in a block 332 responsive to the user selected coupling reduction methodology of moving signal traces or adding additional mesh to the mesh layer between the existing traces for reducing coupled noise. Also a combination of both moving signal traces and adding additional mesh to the mesh layer between the existing traces for reducing coupled noise can be used to generate the updated design file at block 332. Then a temporary input file is generated as indicated in a block 334 and applied to the package vertical coupled noise identification engine at block 312. Then the exemplary operations are repeated for the temporary input file generated at block 334.

FIGS. 4-8 show an example of instances of where the method and program of the preferred embodiment identifies coupling through the mesh plane. The program determines an optimal solution for reducing coupled noise based up limitations of the design parameters. A pair of arrows in each of the FIGS. 4-8 points to the traces exhibiting coupled noise for this example.

Figure 4:
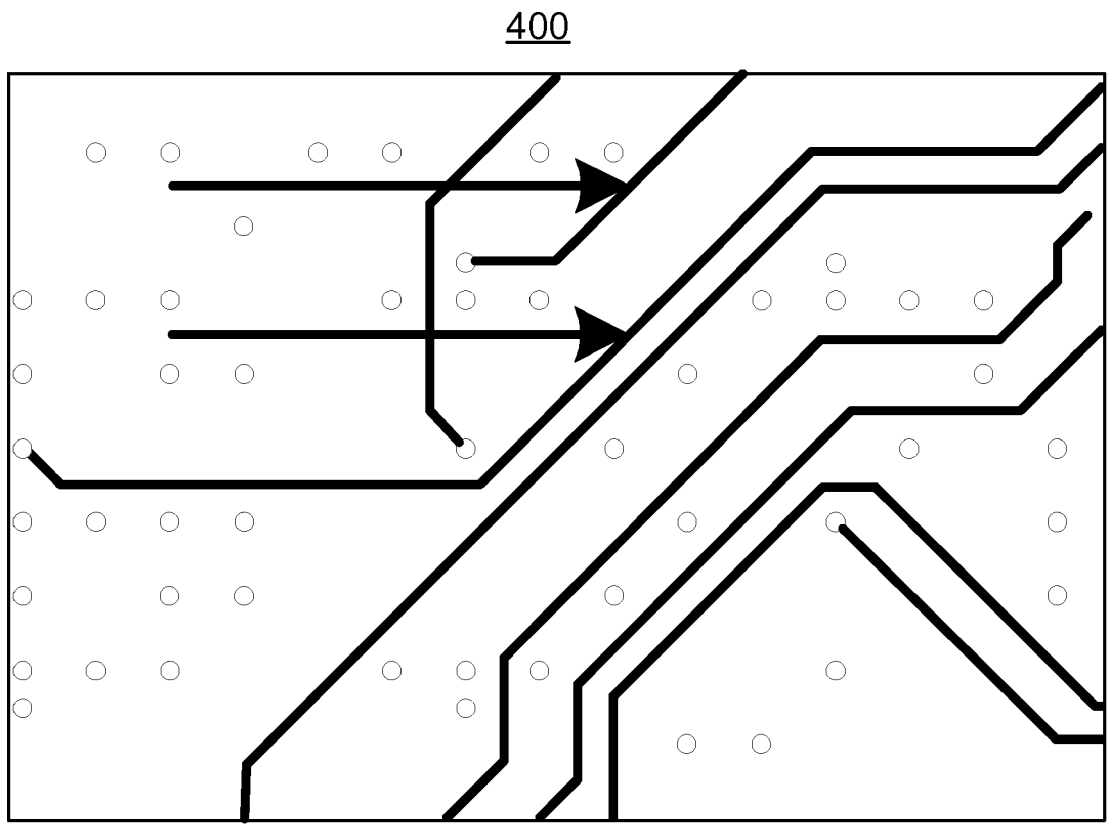
FIG. 4 is a diagram illustrating an exemplary signal plane above a mesh plane in an electronic package.
Figure 5:
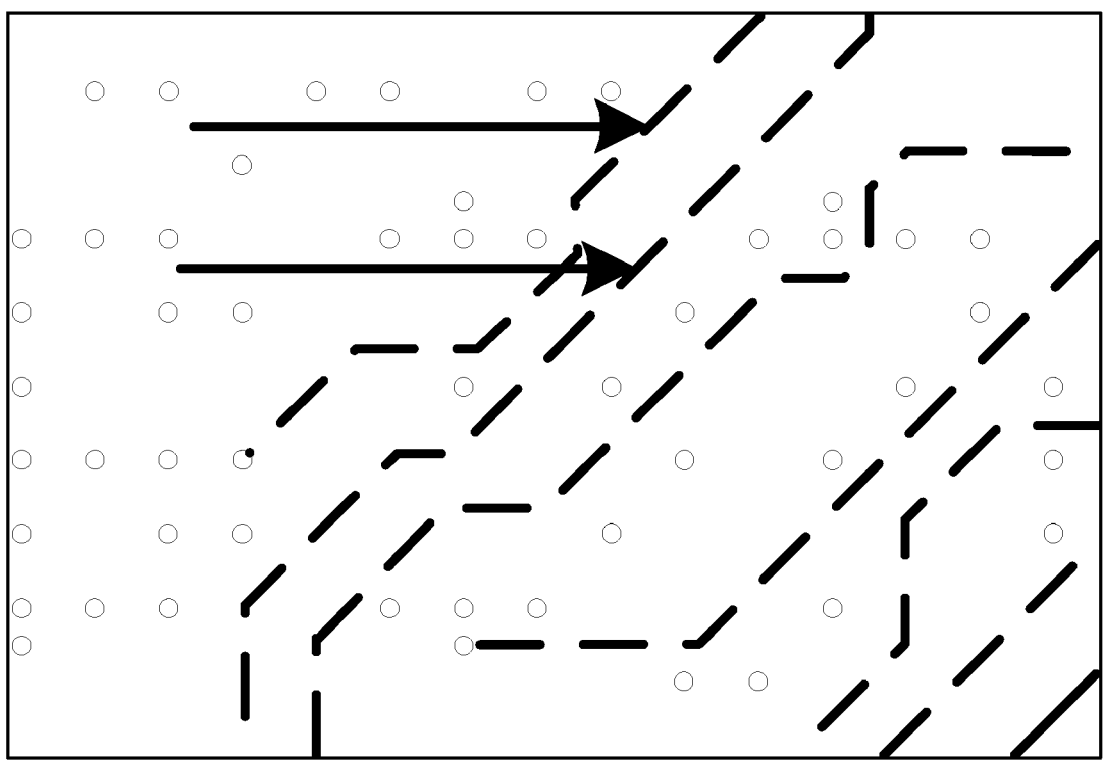
FIG. 5 is a diagram illustrating an exemplary signal plane below a mesh plane in an electronic package.

Referring now to FIGS. 4 and 5, in FIG. 4 there is shown an exemplary signal plane generally designated by reference character 400 to be positioned above a mesh plane (not shown) in an electronic package. FIG. 5 illustrates an exemplary signal plane generally designated by reference character 500 to be positioned below a mesh plane (not shown) in an electronic package. Signal lines representing signal routing plane 400 above the mesh reference are shown in solid lines, with dotted lines representing signal routing plane 500 below the mesh.

Figure 6:
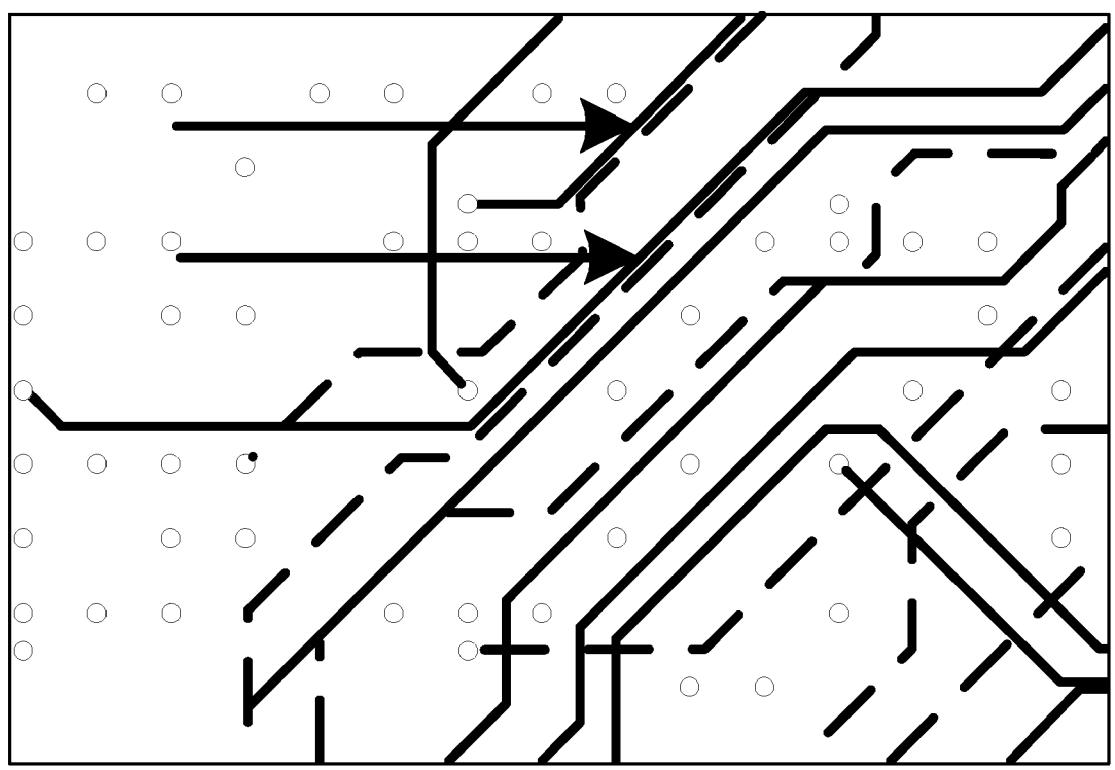
FIG. 6 is a diagram illustrating the exemplary signal planes of FIGS. 4 and 5 together without a mesh plane in the electronic package.

Referring now to FIG. 6, there is shown an exemplary structure generally designated by reference character 600 including the exemplary signal planes 400 and 500 of FIGS. 4 and 5 together without a mesh plane in the electronic package. In FIG. 6, the wiring layers only shown where the vertically coupled noise control program 134 of the preferred embodiment advantageously can move the respective signal traces of signal planes 400 and 500 of FIGS. 4 and 5 to minimize coupling A typical package design can have multiple instances of this structure throughout the design.

Figure 7:
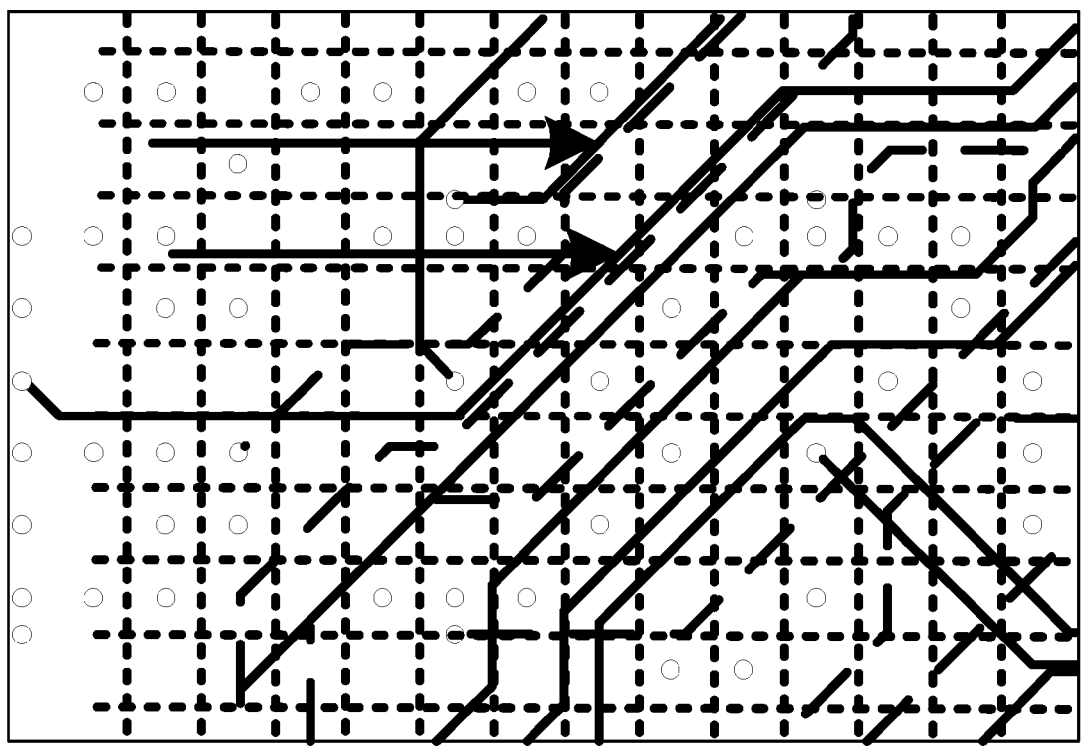
FIG. 7 is a diagram illustrating the exemplary signal planes of FIGS. 4 and 5 together with an initial mesh plane in the electronic package.
Figure 8:
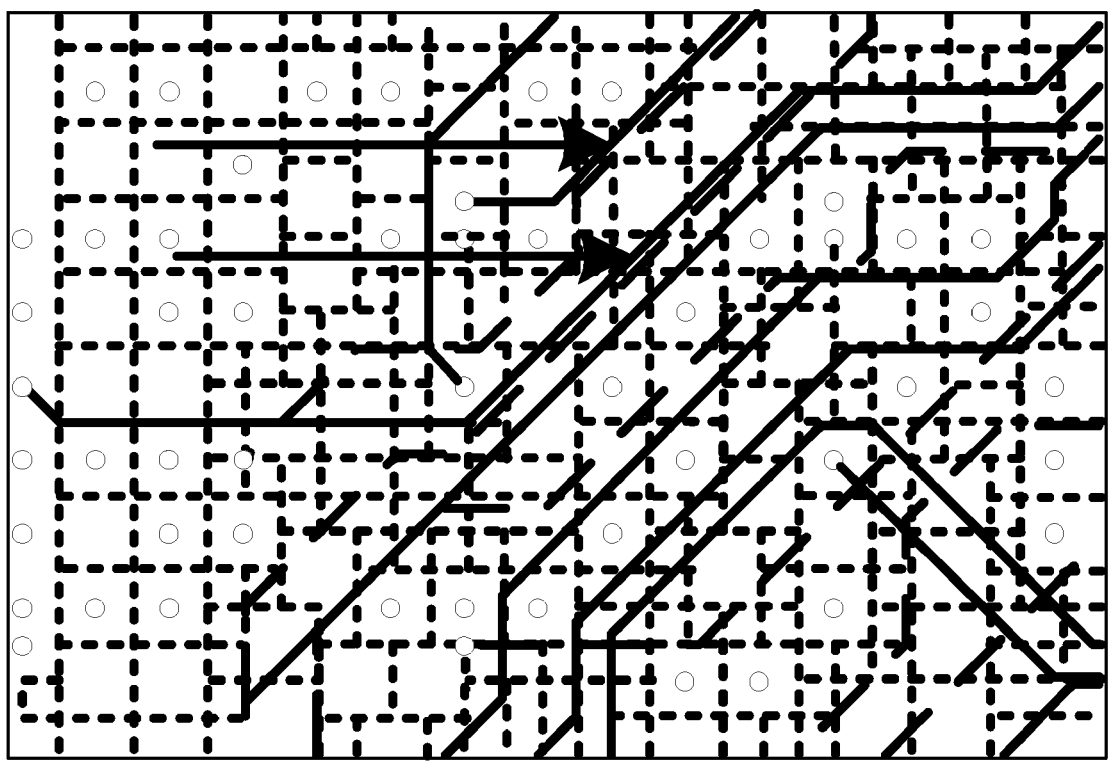
FIG. 8 is a diagram illustrating the exemplary signal planes of FIGS. 4 and 5 together with an exemplary resulting mesh plane minimizing vertically coupled noise control in the electronic package.

Referring now to FIGS. 7 and 8, in FIG. 7 there is shown an exemplary structure generally designated by reference character 700 including the exemplary signal planes 400 and 500 of FIGS. 4 and 5 together with an initial mesh plane in the electronic package. In FIG. 8 there is shown an exemplary structure generally designated by reference character 800 including the exemplary signal planes of FIGS. 4 and 5 together with an exemplary resulting mesh plane minimizing vertically coupled noise control in the electronic package. In FIG. 8, the wiring and mesh layers are shown where the vertically coupled noise control program 134 of the preferred embodiment advantageously has added more mesh to minimize coupling.

Figure 9:
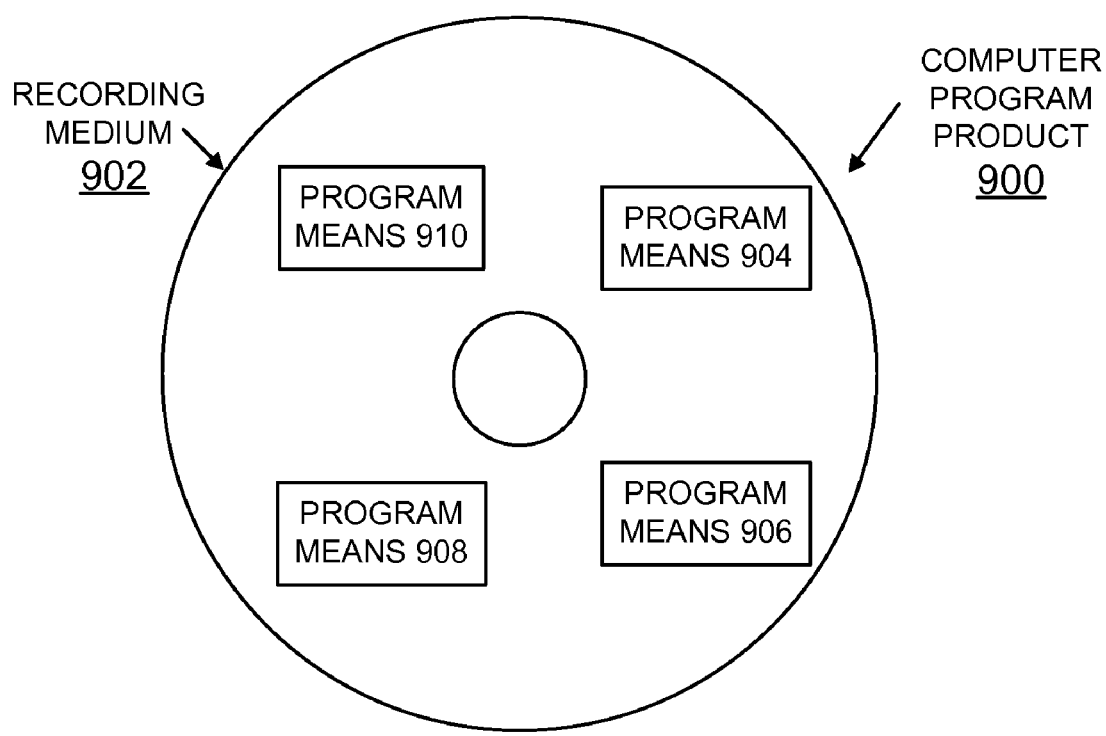
FIG. 9 is a block diagram illustrating a computer program product in accordance with the preferred embodiment.

Referring now to FIG. 9, an article of manufacture or a computer program product 900 of the invention is illustrated. The computer program product 900 includes a recording medium 902, such as, a floppy disk, a high capacity read only memory in the form of an optically read compact disk or CD-ROM, a tape, a transmission type media such as a digital or analog communications link, or a similar computer program product. Recording medium 902 stores program means 904, 906, 908, 910 on the medium 902 for carrying out the methods for implementing vertically coupled noise control through a mesh plane within electronic packages of the preferred embodiment in the system 100 of FIGS. 1 and 2.

A sequence of program instructions or a logical assembly of one or more interrelated modules defined by the recorded program means 904, 906, 908, 910, direct the computer system 100 for implementing vertically coupled noise control through a mesh plane of the preferred embodiment.

While the present invention has been described with reference to the details of the embodiments of the invention shown in the drawing, these details are not intended to limit the scope of the invention as claimed in the appended claims.

What is claimed is:

1. An apparatus for implementing vertically coupled noise control through a mesh plane in an electronic package design comprising:
   a processor;
   a electronic package design program and a vertically coupled noise control program, each including instructions stored on a non-transitory computer readable storage medium, said processor executing said instructions wherein:
   said electronic package design program receiving electronic package physical design data;
   said vertically coupled noise control program identifying instances of vertically coupled noise in the electronic package physical design data; said vertically coupled noise control program quantifying the identified instances of vertically coupled noise; responsive to the quantified identified instances of vertically coupled noise, receiving physical design file constraints, said physical design file constraints including mesh fill density limitations, conductor/via proximity, and impedance limitations; and generating an updated design file including modifying the electronic package physical design data for limiting the identified instances of vertically coupled noise including selectively adding mesh to a mesh layer between signal traces adjacent to the identified instances of vertically coupled noise for reducing vertically coupled noise, and selectively moving signal traces for reducing vertically coupled noise.

2. The apparatus for implementing vertically coupled noise control as recited in claim 1 wherein said received electronic package physical design data includes one of more user selections of a target design level for vertically coupled noise; a noise coupling reduction methodology; a manual or automatic design fix; and a list of victim nets.

3. The apparatus for implementing vertically coupled noise control as recited in claim 1 wherein said vertically coupled noise control program generates an output indicating the locations and severity of the vertically coupled noise.

4. A computer program embodied on a non-transitory computer readable storage medium for implementing vertically coupled noise control in electronic packages in a computer system, said computer program including instructions stored on said non-transitory computer readable storage medium, wherein said instructions, when executed by the computer system to cause the computer system to perform the steps of:
   receiving electronic package physical design data;
   identifying instances of vertically coupled noise in the electronic package physical design data;
   quantifying the identified instances of vertically coupled noise;
   responsive to the quantified identified instances of vertically coupled noise, receiving physical design file constraints, said physical design file constraints including mesh fill density limitations, conductor/via proximity, and impedance limitations; and
   generating an updated design file including modifying the electronic package physical design data for limiting the identified instances of vertically coupled noise including selectively adding mesh to a mesh layer between signal traces adjacent to the identified instances of vertically coupled noise for reducing vertically coupled noise, and selectively moving signal traces for reducing vertically coupled noise.

5. The computer program for implementing vertically coupled noise control as recited in claim 4 wherein the step modifying the electronic package physical design data for limiting the identified instances of vertically coupled noise includes the steps of identifying a user selected noise coupling reduction methodology.

* * * * *